March 8, 1938. B. P. GRAVES 2,110,295
MACHINE TOOL STRUCTURE
Filed June 2, 1934   2 Sheets-Sheet 1
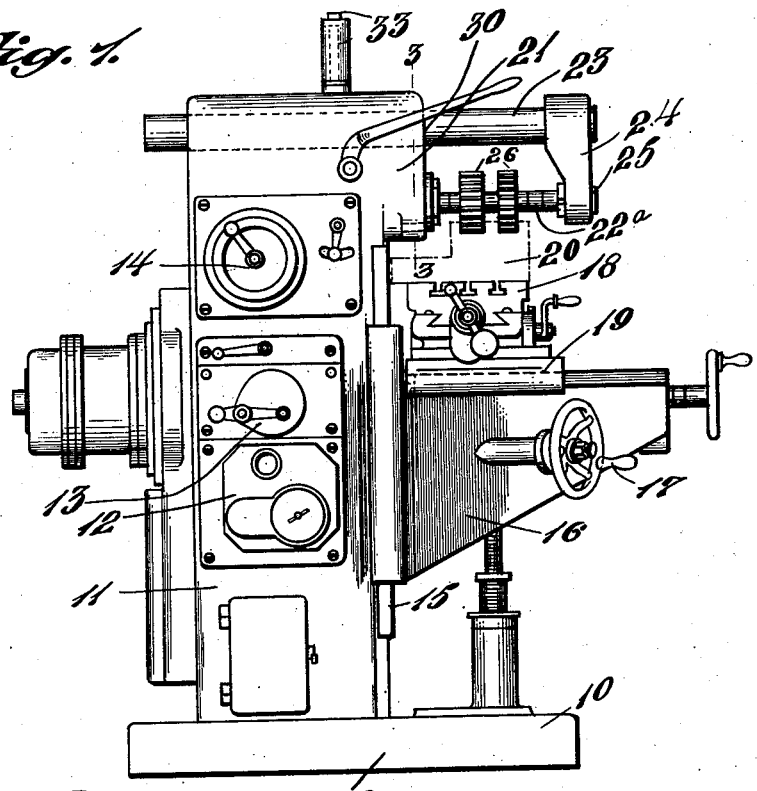
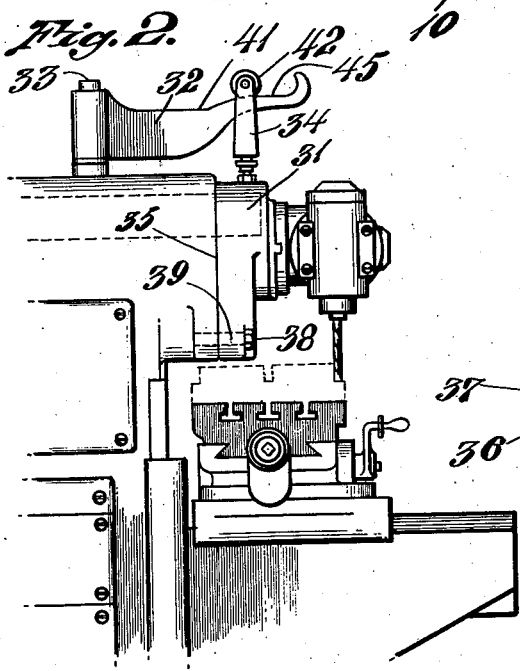
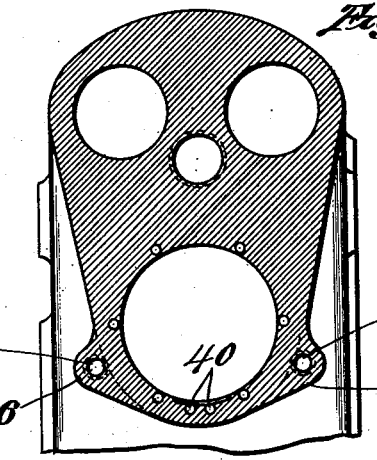
INVENTOR.
Benjamin P. Graves
BY Barlow & Barlow
ATTORNEYS.

March 8, 1938.     B. P. GRAVES     2,110,295
MACHINE TOOL STRUCTURE
Filed June 2, 1934     2 Sheets-Sheet 2
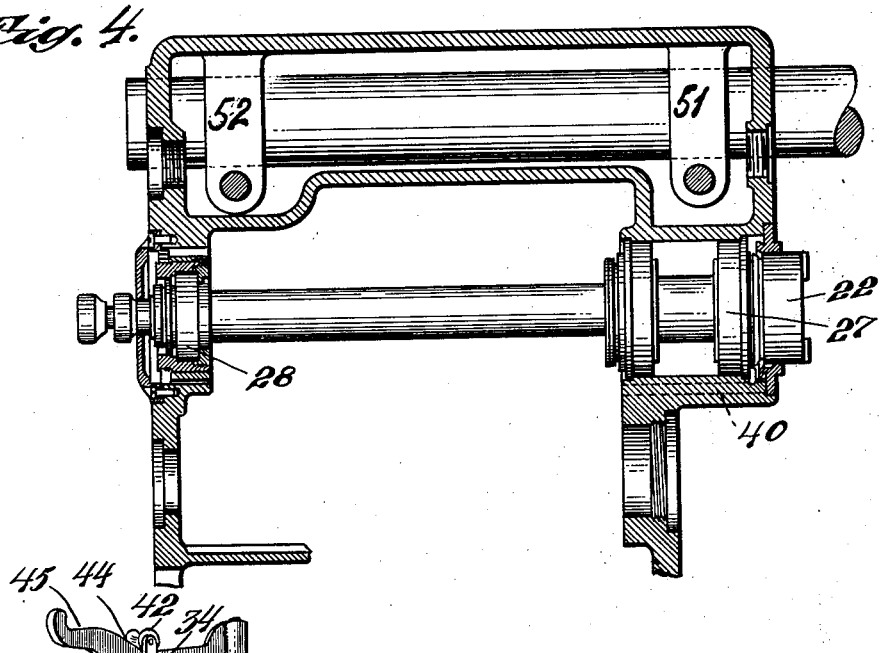
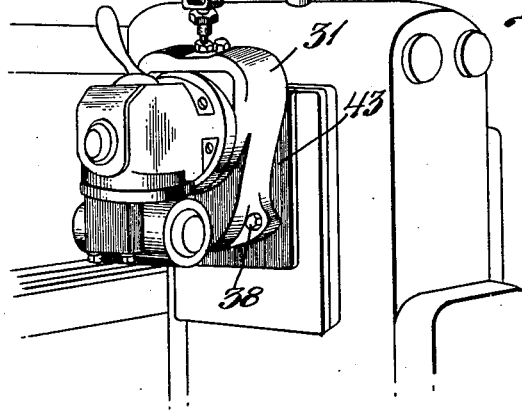
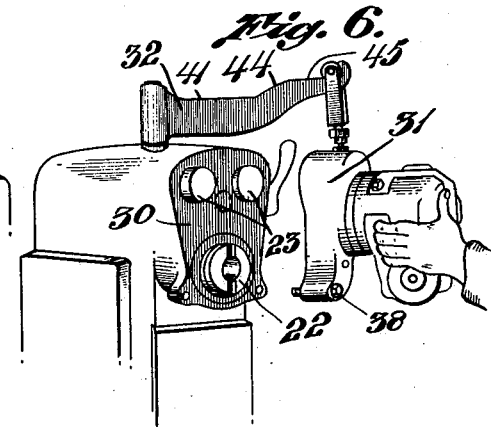
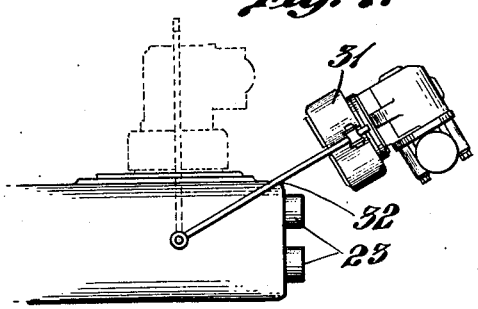
INVENTOR.
Benjamin P. Graves
BY
Barlow & Barlow
ATTORNEYS.

Patented Mar. 8, 1938

2,110,295

UNITED STATES PATENT OFFICE 2,110,295

MACHINE TOOL STRUCTURE

Benjamin P. Graves, Edgewood, R. I., assignor to Brown & Sharpe Manufacturing Company, a corporation of Rhode Island Application June 2, 1934, Serial No. 728,741

9 Claims. (Cl. 90—11)

This invention relates to a machine tool structure; and has for one of its objects the provision of greater rigidity for the support of the spindle upon which the cutters are mounted.

Another object of the invention is the provision of a more rigid overarm support for the spindle which assists in preventing vibration of the spindle during its operation.

Another object of the invention is the provision of a standard having an overhanging portion in which the spindle and overarms are mounted and which will permit the table to pass beneath the overhang with the vise or fixture and work mounted therein.

Another object of the invention is to shorten up the arbor.

Another object of the invention is to provide a more convenient mounting for attachments by reason of structures possible with the overhang of the standard.

Another object of the invention is to provide a mounting on the machine for an attachment when the attachment is not in use.

Another object of the invention is the provision of means for swinging this attachment from its inoperative mounting on the machine to its operative position on the machine, whereby the operator does not have to support the weight of the attachment at any time during its movement between its two positions.

A further object of the invention is the provision of a crane which is so arranged that the attachment may be nicely controlled in its manipulation from operative to inoperative mounted position on the machine.

With these and other objects in view, the invention consists of certain novel features of construction, as will be more fully described, and particularly pointed out in the appended claims.

In the accompanying drawings:

Fig. 1 is a side elevation illustrating the new overhanging portion at the top of my machine tool structure;

Fig. 2 illustrates the upper end of this structure in a similar view with an attachment mounted in place;

Fig. 3 is a sectional view through the overhanging portion upon which the attachment is mounted, also illustrating the openings for the overarms and spindle;

Fig. 4 is a sectional view of the upper end of the machine showing the bearings of both the spindle and the overarm;

Fig. 5 is a perspective view illustrating the side of the machine on which the attachment is mounted when in inoperative position;

Fig. 6 is a perspective view illustrating the attachment about to be mounted upon the working face of the machine and supported by the crane also on the upper end of the machine;

Fig. 7 is a top plan view illustrating diagrammatically the swinging of the attachment from its inoperative to its operative position by means of the crane, the inoperative position being illustrated in dotted lines.

The usual rigid standard is made with its front surface and back surface each in substantially the same vertical plane throughout its length with these surfaces parallel to each other throughout their extent. The knee is usually mounted for vertical movement along the front surface or face of this standard, and the cutter arbor and the overarm extend from the standard at a point above the knee. Even in the rigidly formed standard such as I have mentioned, if the machine be pushed hard, there will be an uneven cut and sometimes cutter breakage, and in order to provide a better support for the spindle, I have projected or formed an overhanging portion of this standard at the upper end thereof, which provides a greatly increased bearing for the spindle and the overarm, the latter of which is longitudinally slidable in bearings in the overhang, and also provides by reason of the height at which this overhang is located, an opportunity for the work carriage to extend beneath it, and thus I may operate on the work close to the cutter with the cutter close to its bearing or support, and thus there will be no unevenness in the cut taken.

Also by reason of this projecting or overhanging portion of the standard, I provide a surface to which the usual attachment may be more readily secured, and by reason of having this surface out of line with the guideway upon which the knee slides, I may use lugs for securing the attachment in place, which lugs will be out of the way and will not interfere with the sliding of the knee, as would be the case in the old form wherein the securing surface is in the same vertical plane in which the knee slides.

I also provide a mounting for the attachment on one of the surfaces of the machine which is ordinarily not used; and further, I provide a crane by which the attachment may be removed from this storage position to its operative position without its being necessary for the operator to lift the weight of the attachment, which greatly facilitates the use of the attachment, the crane being such that the attachment may be moved up and outwardly so as to clear the corner of the machine in moving from one position to the other, which positions are usually at right angles to each other, the same cap bolt being used for securing it in inoperative storage position as are used for securing it in operative position. Also, where such overhang is lacking, lugs or cap bolt cannot be screwed directly into the standard, as this standard provides an oil-tight pocket for the lubrication of the parts, and such opening would interfere with and allow the lubricant to escape; and the following is a more detailed description of the present embodiment of this invention, illustrating the preferred means by which these advantageous results may be accomplished:

With reference to the drawings, 10 designates a base from which there extends upwardly a standard 11 which is rigid throughout its height and encloses certain operative mechanism for the milling machine here shown, with different controls designated generally 12, 13 and 14, shown on the side thereof. A guideway or slideway 15 is provided on the front of this standard upon which there is mounted a knee 16 for vertical sliding movement, which may be raised or lowered to position the work to a suitable height from the cutter. A control for the vertical position of the knee is illustrated at 17, and on the knee there is located a reciprocable work carriage 18 which may be suitably mounted in accordance with the usual practice for in and out movement upon a slide 19. This carriage receives suitable driving motion from the mechanism within the standard 11 as is well known in the art, and I have illustrated in dot-dash lines in Fig. 1 the work 20 as mounted in position.

The standard is cast in a shape to provide an integral overhanging portion 21 jutting out from its upper end forwardly over the work carriage and knee to provide a rigid support, and through this overhanging portion there extends the spindle 22 and the overarms 23. The overarms 23 are supported in split bearings or clamps 51 and 52 the forward one 51 of which is located in the overhanging portion to provide an increased length of support in the rigid standard as one bearing is beyond and forward of that which would be afforded if the standard did not have this overhanging portion 21, but merely had its front edge extending upwardly in line with the slideway 15. A plurality of bearings 27, 28 and 29 are provided for the spindle. Front bearing 27 is located in the overhanging portion, intermediate bearing 29 is located approximately above the front wall of the standard and rear bearing 28 is located in the rear wall of the standard. The pair of bearings 27 and 29 work together to take opposite thrust, while the rear bearing 28 is more or less of a guide. This overhanging portion thus by enabling these bearings to be spaced further apart provides an increased support for the spindle 22 by reason of the bearing 27 for the outer end being located closer to the work and a greater distance from the bearing 28 located at the opposite end. The bearing 27 affords a support much closer to the cutters when they are operating on the work, and thus prevents chattering. Further, by reason of this overhanging portion, the work may also extend beneath the cutters to a greater extent and greater flexibility of the sliding movement of the work is afforded. Thus, there is a greater throat distance provided enabling a greater range of movement and operation upon the work. These overarms are provided on their outer ends with a yoke 24 which provides a bearing 25 for the outer end of the cutter arbor 22a, upon which arbor the cutters 26 are mounted in the usual way.

The face of the guideway 30 of the overhanging portion 21 is finished and provides an abutment surface for an attachment 31 which is rigged on the crane 32 pivotally supported on the post 33 mounted on the upper end of the standard. This crane also includes the drop 34 which engages the attachment 31. This attachment is positioned by abutting its finished surface 35 against the finished surface 30, and providing recesses in surface 35 to receive the ends of the overarms which are slid inwardly so as to leave them projecting a short distance beyond the surface 30; and in order to secure this attachment in place, I have provided lugs 36 on either side of this surface with threaded openings 37 therein which will receive cap screws 38 rotatably mounted in openings 39 in the attachment and engaging threaded opening 37 in the standard to hold the attachment securely in place. This attachment will receive its drive from the spindle shaft which has a key in the end thereof to fit a recess in the driven member of the attachment.

The crane 32 is provided with different level surfaces. There is a surface 41 at a height so that when the drop 34 has its wheel 42 engaging this surface 41, the attachment will be at the proper level to be bolted on to the surface 43 on the side of the machine which is the inoperative storage position in which the attachment 31 is carried on the machine, the bolt 38 being used to thread into a suitable opening along this surface 43 to secure the attachment in this position. This position of mounting the attachment when not in use, saves taking the attachment completely off and separating it from the machine for storage in the stock room of the shop, which necessitates the carrying of this heavy portion, thereby consuming considerable time and considerable physical exertion. When it is desired to move the attachment from its inoperative position, as illustrated in Figure 5, up against the surface 43, the drop 34 is moved outwardly on the crane by means of the wheel 42 sliding upwardly along the inclined surface 44 and onto the raised surface 45 of the crane, whereby the attachment is moved outwardly from its inoperative position on surface 43 to a position in which the crane may now be swung by rotating it on its pivot 33, such as illustrated in Figure 7, to move the attachment into its operating position where it may be pushed inwardly to abut against the surface 35 which is on the overhanging portion of the machine (see in this connection, Figure 6), and when the crane is swung around so that it is in line with this surface, the attachment 31 is then slid inwardly along the upper level 41 of the crane until it is in the position as shown in Figure 2, where it properly aligns with the abutment surface 30 and may be clamped in this operative position by a screw or cap screw 38 suitably rotatably supported in the attachment.

The overhang provides an improved and marked advantage in the use of such attachments as it gives an increased throat distance and allows a much greater range of movement for operation upon the work. The lugs 36 could not formerly be used on the standard where no overhang was provided because they would interfere with movement of the knee 16 in its extreme vertical position. Also there was danger of leakage of the lubricant which was contained in the standard by reason of any opening being drilled through the casing into the interior. Where the lugs are positioned at either side of this surface, this danger is not present. The spindle bearing 27 runs with lubrication about it, which lubrication is returned to the interior of the casing by conduits 46 formed in the casing along the overhanging portion thereof and leading back to the interior thereof by which the circulation of the lubricant may be maintained.

By the above arrangement, I have provided an increased support for the spindle and reduce vibration of the spindle, and I am enabled to utilize shorter arbors which are consequently stiffer and thus afford a firmer cutter action. The cutter will thus be less liable to break and a more even cut may be taken. I also have increased the support for the overarm which assists in making the arbor more rigid. Further, the overhang permits the table to pass beneath it with a greater range for the work, and I also have the attendant advantages in mounting the attachment in place.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a machine tool structure, a rigid generally vertical standard, a fixed rigid overhang integral with and extending outwardly from the upper portion of said standard, a rotatable spindle, a plurality of bearings fixed in said rigid parts for rotatably supporting said spindle, one of said bearings being located in said overhanging portion and adapted to rigidly support the front portion of said spindle close to its forward extremity.

2. In a machine tool structure, a rigid generally vertical standard, a fixed rigid overhang integral with and extending outwardly from the upper portion of said standard, a rotatable spindle, front, intermediate and rear bearings fixed in the rigid standard parts with the front bearing located in said overhanging portion and adapted to rigidly support the front portion of said spindle beyond the front wall of the standard and close to its forward extremity.

3. In a machine tool structure, a rigid generally vertical standard, a fixed rigid overhang integral with and extending outwardly from the upper portion of said standard, a rotatable spindle, front, intermediate and rear bearings fixed in the rigid standard parts with the front bearing located in said overhanging portion with a portion forward of the front wall of the standard and adapted to rigidly support the front portion of said spindle close to its forward extremity, and said intermediate bearing being located adjacent said front bearing.

4. In a machine tool structure, a rigid generally vertical standard, a fixed rigid overhang integral with and extending outwardly from the upper portion of said standard, a rotatable spindle, front, intermediate and rear bearings fixed in the rigid standard parts with the front bearing located in said overhanging portion with a portion forward of the front wall of the standard and adapted to rigidly support the front portion of said spindle close to its forward extremity, said intermediate bearing being located above the front wall of the standard and adjacent said front bearing, and said rear bearing located close to the rearward extremity of said spindle and in the rear wall of the standard.

5. In a machine tool structure, a rigid hollow standard, a rotatable spindle, a knee slidable for vertical movement along the lower portion of said standard, a work carriage movable towards and from said standard and reciprocable in a direction transverse to the axis of said spindle, a fixed rigid overhang intergal with and extending outwardly from the upper portion of said standard over said knee, a plurality of bearings fixed in said rigid parts for rotatably supporting said spindle, one of said bearings being located in said overhanging portion and adapted to rigidly support the front portion of said spindle close to its forward extremity, and over the path of movement of said carriage.

6. In a machine tool structure, a rigid hollow upright standard having a front and a rear wall, a fixed rigid overhang integral with said front wall at its upper portion and extending outwardly and forwardly therefrom, a rotatable spindle, and front and rear bearings for rotatably supporting said spindle in said rigid parts, said front bearing being located in said overhanging portion and supporting the front portion of the spindle to a point beyond the front wall of said standard.

7. In a machine tool structure, a rigid upright hollow standard having a front and a rear wall, a fixed rigid overhang integral with said front wall at its upper portion and extending outwardly and forwardly therefrom, a rotatable spindle, an overarm adjustably supported from the upper portion of said standard and extensible in a direction parallel with the axis of said spindle, a front support for said overarm, and a front bearing for said spindle, both support and bearing being located in said overhanging portion and supporting the front portions of the overarm and spindle to a point beyond the front wall of said standard.

8. In a milling machine, a rigid hollow upright standard having a front and a rear wall, a rotatable spindle, a knee slidable for vertical movement along the lower portion of said standard, a work carriage movable towards and from said standard and reciprocable in a direction transverse to the axis of said tool spindle, a fixed rigid overhang extending forwardly from the front wall of said standard at its upper portion, and over said knee, and front and rear bearings for rotatably supporting said spindle and fixed in said rigid parts, said front bearing being located in said overhanging portion and supporting the front portion of said spindle adjacent the front of said overhanging portion and beyond the front wall of said standard.

9. In a milling machine, a rigid hollow upright standard having a front and a rear wall, a rotatable tool spindle, a knee slidable for vertical movement along the lower portion of the front wall of said standard, a work carriage movable towards and from said standard and reciprocable in a direction transverse to the axis of said spindle, a fixed rigid overhang extending forwardly from the front wall of said standard at its upper portion and over said knee, an overarm adjustably supported from the upper portion of said standard and extensible in a direction parallel with the axis of said spindle, front and rear supports for said overarm, and front and rear bearings for rotatably supporting said spindle both fixed in said rigid parts, said front support and bearing being both located in said overhanging portion and supporting the front portion of said overarm and spindle adjacent an end of said overhanging portion and beyond the front wall of said standard.

BENJAMIN P. GRAVES.